United States Patent
Nagai

(10) Patent No.: US 11,684,911 B2
(45) Date of Patent: Jun. 27, 2023

(54) METHOD FOR MANUFACTURING CATALYST AND CATALYST

(71) Applicant: SUBARU CORPORATION, Tokyo (JP)

(72) Inventor: Ryo Nagai, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 244 days.

(21) Appl. No.: 17/174,741

(22) Filed: Feb. 12, 2021

(65) Prior Publication Data
US 2021/0276001 A1    Sep. 9, 2021

(30) Foreign Application Priority Data
Mar. 9, 2020    (JP) .................. 2020-039496

(51) Int. Cl.
*B01J 37/02* (2006.01)
*B01J 35/04* (2006.01)
*B01J 37/08* (2006.01)
*F01N 3/10* (2006.01)

(52) U.S. Cl.
CPC ......... *B01J 37/0228* (2013.01); *B01J 35/04* (2013.01); *B01J 37/0219* (2013.01); *B01J 37/0221* (2013.01); *B01J 37/08* (2013.01); *F01N 3/101* (2013.01); *F01N 2570/14* (2013.01)

(58) Field of Classification Search
CPC .... B01J 37/0228; B01J 37/0219; B01J 37/08; B01J 35/04
See application file for complete search history.

(56) References Cited

U.S. PATENT DOCUMENTS 8,133,841 B2 * 3/2012 Noda ............... B01D 46/24492
                                                                422/177
2012/0040824 A1    2/2012 Itou et al.

FOREIGN PATENT DOCUMENTS

JP       2010-253447 A     11/2010
WO    WO-2020204571 A1 *  10/2020 ......... B01D 53/9418

* cited by examiner

*Primary Examiner* — Yong L Chu
(74) *Attorney, Agent, or Firm* — McDermott Will & Emery LLP

(57) ABSTRACT

A method for manufacturing a catalyst includes depositing a catalyst slurry containing at least a catalyst metal and water on a support, depositing particles of a water-absorbing polymer on a surface of the catalyst slurry, expanding the particles to a predetermined size with the water present in the catalyst slurry, and firing the support having the catalyst slurry and the particles deposited on the catalyst slurry.

9 Claims, 6 Drawing Sheets

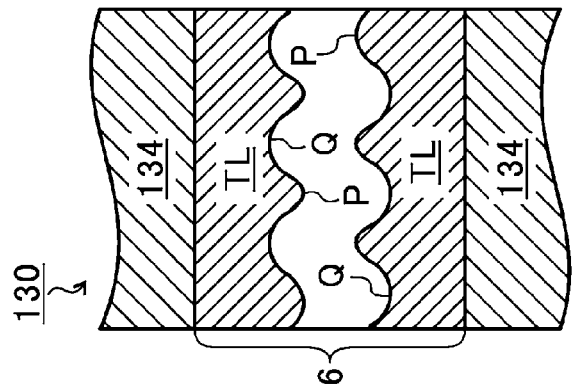
FIG. 4A
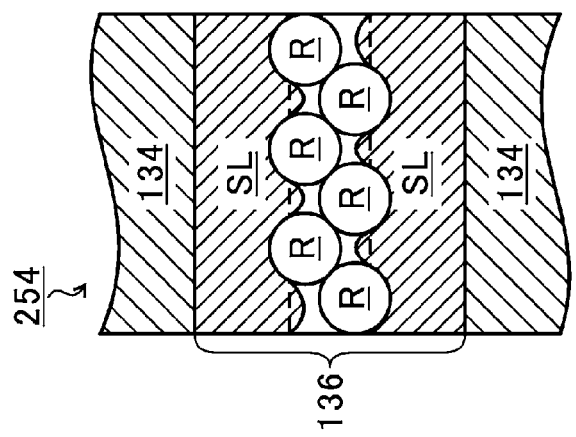
FIG. 4B
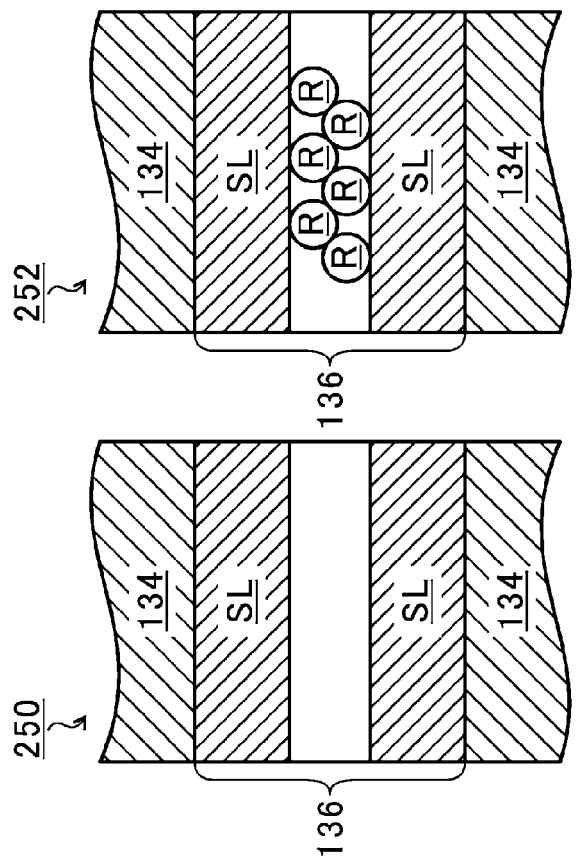
FIG. 4C
FIG. 4D

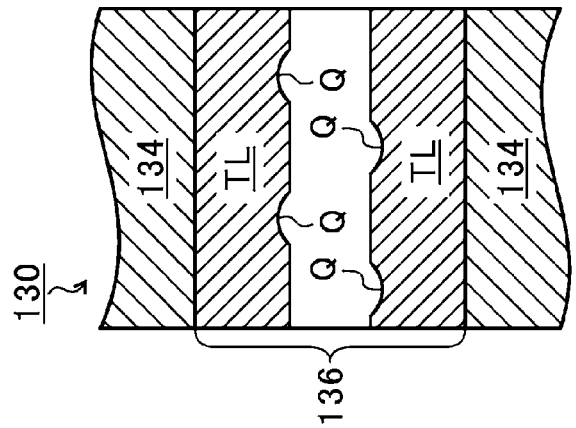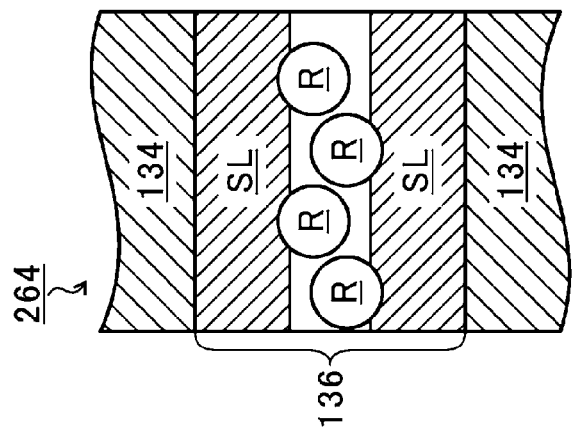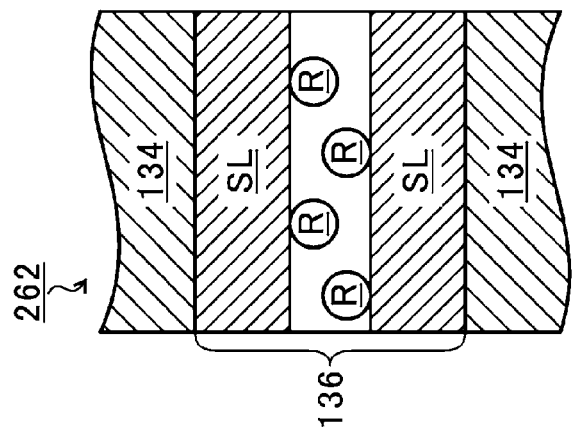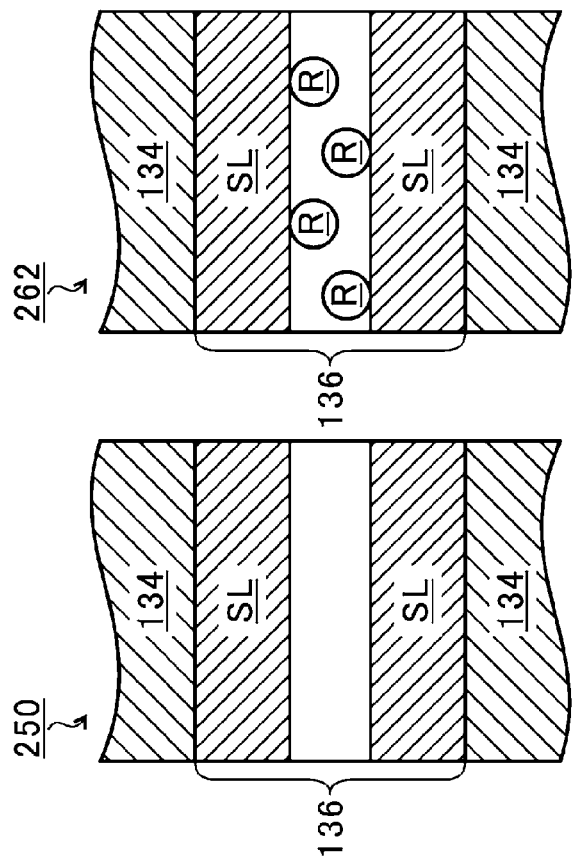

METHOD FOR MANUFACTURING CATALYST AND CATALYST

CROSS-REFERENCE TO RELATED APPLICATIONS

The present application claims priority from Japanese Patent Application No. 2020-039496 filed on Mar. 9, 2020, the entire contents of which are hereby incorporated by reference.

BACKGROUND

The disclosure relates to catalysts for use in exhaust pipes of vehicles and methods for manufacturing such catalysts.

Three-way catalysts are disposed in exhaust pipes of vehicles to remove hydrocarbons (HC), carbon monoxide (CO), and nitrogen oxide ($NO_x$) from exhaust gas (e.g., Japanese Unexamined Patent Application Publication No. 2010-253447). Three-way catalysts oxidize hydrocarbons into water and carbon dioxide ($CO_2$), oxidize carbon monoxide into carbon dioxide, and reduce nitrogen oxide into nitrogen ($N_2$).

In addition, recently, engines capable of lean-burn operation, in which fuel is burned at an air-fuel ratio leaner than the theoretical (stoichiometric) air-fuel ratio, have been developed. The amount of nitrogen oxide present in exhaust gas from an engine during lean burn is larger than that during stoichiometric burn. Accordingly, $NO_x$ storage-reduction catalysts, which store nitrogen oxide and reduce (purify) the nitrogen oxide stored therein at a predetermined timing, are disposed in exhaust pipes of vehicles on which engines capable of lean-burn operation are mounted.

SUMMARY

An aspect of the disclosure provides a method for manufacturing a catalyst. The method includes depositing a catalyst slurry containing at least a catalyst metal and water on a support, depositing particles of a water-absorbing polymer on a surface of the catalyst slurry, expanding the particles to a predetermined size with the water present in the catalyst slurry, and firing the support having the catalyst slurry and the particles deposited on the catalyst slurry.

An aspect of the disclosure provides a catalyst manufactured by the method.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIGS. 4A to 4D illustrate the interior of cells in the catalyst slurry deposition step, the particle deposition step, an expansion step, and a firing step according to the first embodiment;

FIGS. 6A to 6D illustrate the interior of cells in a catalyst slurry deposition step, a particle deposition step, an expansion step, and a firing step according to the second embodiment.

DETAILED DESCRIPTION

It has been desired to develop a technique by which the purification efficiency of exhaust gas on catalysts such as three-way catalysts and $NO_x$ storage-reduction catalysts can be improved.

Accordingly, it is desirable to provide a catalyst that allows for improved purification efficiency of exhaust gas and a method for manufacturing such a catalyst.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
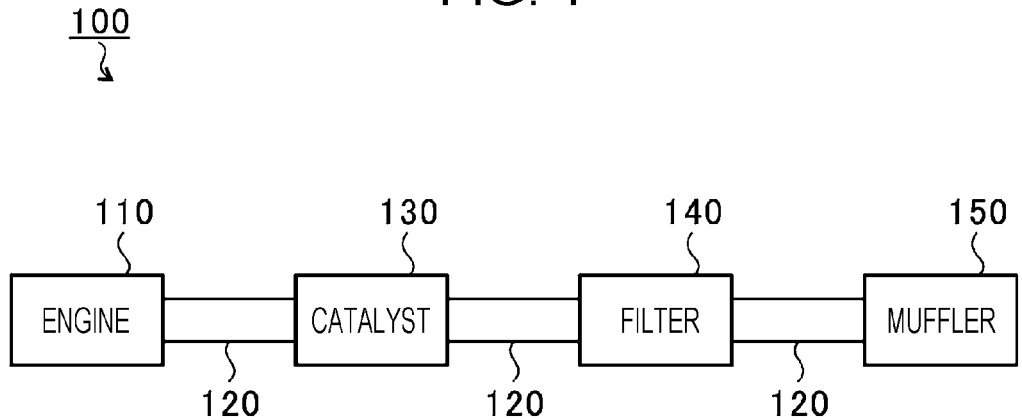
FIG. 1 is a schematic view illustrating the configuration of an engine system according to a first embodiment.

FIG. 1 is a schematic view illustrating the configuration of an engine system 100 according to a first embodiment. The engine system 100 is mounted on a vehicle. As illustrated in FIG. 1, the engine system 100 includes an engine 110, an exhaust pipe 120, a catalyst 130, a filter 140, and a muffler 150.

The engine 110 is, for example, a gasoline engine. The engine 110 causes the vehicle to run on kinetic energy produced by burning fuel. The exhaust pipe 120 is coupled via an exhaust manifold to an exhaust port of the engine 110. Exhaust gas from the exhaust port of the engine 110 is directed into the exhaust pipe 120.

The catalyst 130 is disposed in the exhaust pipe 120. The catalyst 130 is a three-way catalyst (TWC). The catalyst 130 purifies exhaust gas by removing hydrocarbons, carbon monoxide, and nitrogen oxide. The catalyst 130 contains a catalyst metal. The catalyst metal is at least one of platinum (Pt), palladium (Pd), or rhodium (Rh).

The filter 140 is disposed in the exhaust pipe 120 downstream of the catalyst 130. In other words, the filter 140 is disposed in the exhaust pipe 120 between the catalyst 130 and the muffler 150. The filter 140 is a gasoline particulate filter (GPF). The filter 140 traps particulate matter (PM) present in exhaust gas.

Exhaust gas purified by the catalyst 130 and having particulate matter removed by the filter 140 is discharged outside through the muffler 150.

Method for Manufacturing Catalyst 130

Figure 2:
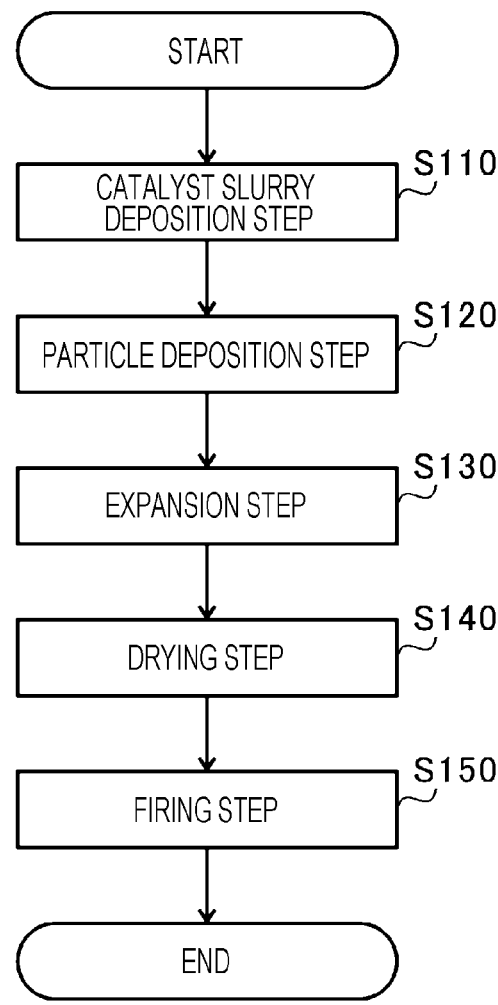
FIG. 2 is a flowchart illustrating the process flow of a method for manufacturing a catalyst according to the first embodiment.

A method for manufacturing the catalyst 130 will be described next. FIG. 2 is a flowchart illustrating the process flow of the method for manufacturing the catalyst 130 according to the first embodiment. As illustrated in FIG. 2, the method for manufacturing the catalyst 130 according to the first embodiment includes a catalyst slurry deposition step S110, a particle deposition step S120, an expansion step S130, a drying step S140, and a firing step S150. The individual steps will hereinafter be described.

Catalyst Slurry Deposition Step S110

The catalyst slurry deposition step S110 is a step of depositing a catalyst slurry on a support to manufacture a slurry-deposited support 250. The catalyst slurry contains a catalyst metal, a binder, a base material, and water.

Figure 3A:
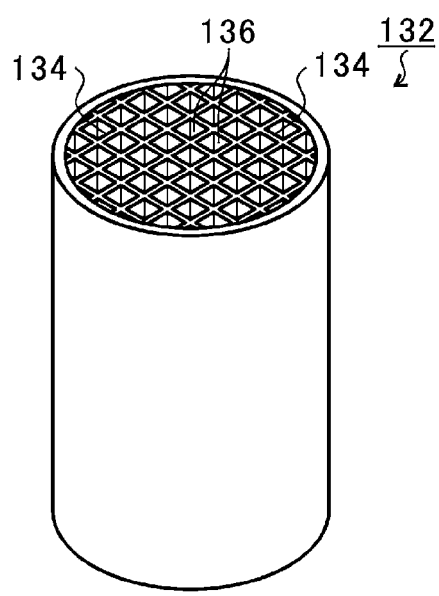
FIGS. 3A to 3C illustrate a catalyst slurry deposition step and a particle deposition step according to the first embodiment.
Figure 3B:
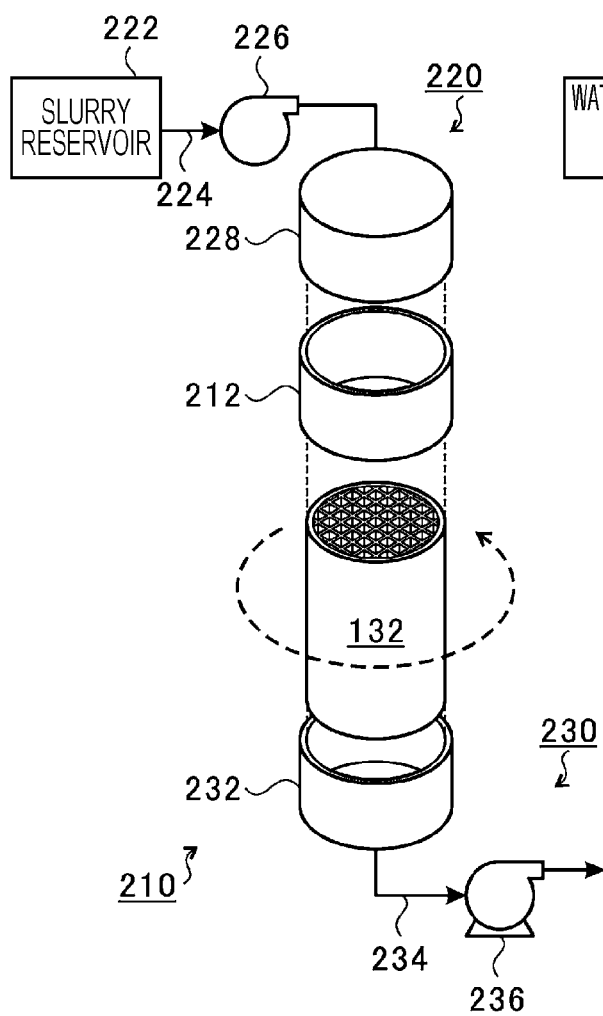
Figure 3C:
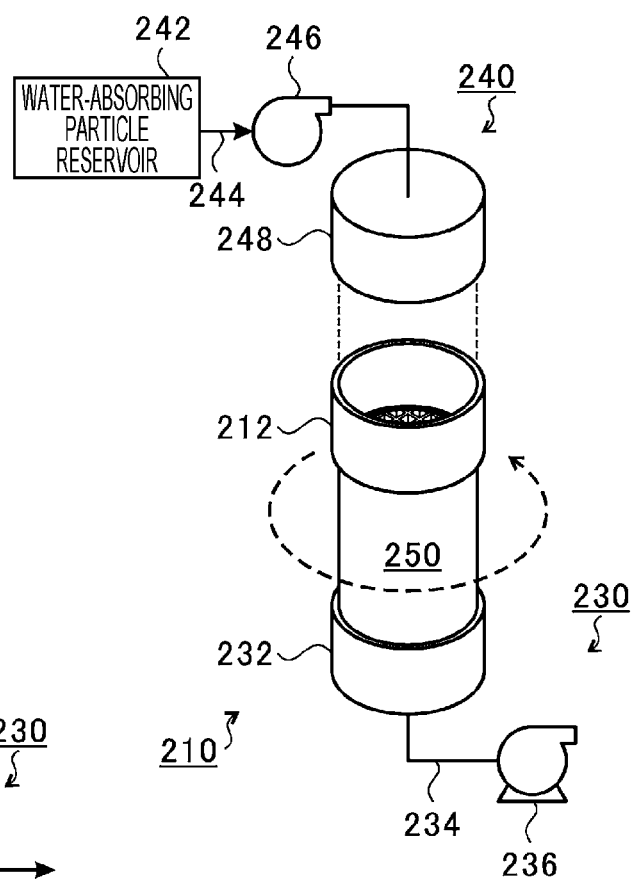

FIGS. 3A to 3C illustrate the catalyst slurry deposition step S110 and the particle deposition step S120 according to the first embodiment. FIG. 3A illustrates a support 132. FIG. 3B illustrates the catalyst slurry deposition step S110. FIG. 3C includes the particle deposition step S120.

As illustrated in FIG. 3A, the support 132 in this embodiment is a honeycomb structure having a cylindrical outer shape. The support 132 has a plurality of cells 136 defined by partition walls 134. The support 132 may have any number of cells 136.

As illustrated in FIG. 3B, the catalyst slurry deposition step S110 includes depositing the catalyst slurry on the surface of the partition walls 134 forming the cells 136 of the support 132 using a supply device 210. The supply device 210 includes a guide cylinder 212, a slurry supply unit 220, a suction unit 230, and a particle supply unit 240 (see FIG. 3C).

The guide cylinder 212 is a cylindrical member. The guide cylinder 212 is fitted to one end of the support 132. The inner diameter of the guide cylinder 212 is slightly larger than the outer diameter of the support 132. The guide cylinder 212 is sized so as to leave no gap between the guide cylinder 212 and the support 132 when fitted to the support 132.

The slurry supply unit 220 supplies the catalyst slurry via the guide cylinder 212 to the support 132 (cells 136). In this embodiment, the slurry supply unit 220 includes a slurry reservoir 222, a slurry supply pipe 224, a slurry supply pump 226, and a slurry nozzle 228.

The slurry reservoir 222 stores the catalyst slurry. The slurry supply pipe 224 couples the slurry reservoir 222 to the suction side of the slurry supply pump 226. The suction side of the slurry supply pump 226 is coupled via the slurry supply pipe 224 to the slurry reservoir 222. The discharge side of the slurry supply pump 226 is coupled to the slurry nozzle 228. The slurry nozzle 228 is coupled to the guide cylinder 212. The slurry supply pump 226 draws the catalyst slurry from the slurry reservoir 222 and ejects the catalyst slurry from the slurry nozzle 228 toward the support 132.

The suction unit 230 draws the catalyst slurry from the other end of the support 132. In this embodiment, the suction unit 230 includes a suction cylinder 232, a suction pipe 234, and a suction pump 236.

The suction cylinder 232 is a cylindrical member. The suction cylinder 232 is open at one end and is sealed at the other end. The opening of the suction cylinder 232 is fitted to the other end of the support 132. The opening of the suction cylinder 232 is slightly larger than the outer diameter of the support 132. The suction cylinder 232 is sized so as to leave no gap between the suction cylinder 232 and the support 132 when fitted to the support 132.

The suction pipe 234 couples the suction cylinder 232 to the suction pump 236. The suction side of the suction pump 236 is coupled via the suction pipe 234 to the suction cylinder 232. The discharge side of the suction pump 236 is coupled to the outside (e.g., the slurry reservoir 222).

In the catalyst slurry deposition step S110, the guide cylinder 212 is fitted to one end of the support 132, and the suction cylinder 232 is fitted to the other end of the support 132. The slurry nozzle 228 is coupled to the guide cylinder 212. The slurry supply pump 226 and the suction pump 236 are driven, and the support 132 is rotated by a rotating device (not illustrated) (indicated by the dashed arrow in FIG. 3B). Thus, the catalyst slurry is uniformly supplied to the cells 136 of the support 132.

FIGS. 4A to 4D illustrate the interior of the cells 136 in the catalyst slurry deposition step S110, the particle deposition step S120, the expansion step S130, and the firing step S150 according to the first embodiment. FIG. 4A illustrates the interior of the cells 136 after the catalyst slurry deposition step S110. FIG. 4B illustrates the interior of the cells 136 after the particle deposition step S120. FIG. 4C illustrates the interior of the cells 136 after the expansion step S130. FIG. 4D illustrates the interior of the cells 136 after the firing step S150.

By performing the catalyst slurry deposition step S110, the catalyst slurry is supplied to the individual cells 136 of the support 132. As illustrated in FIG. 4A, a layer of the catalyst slurry (slurry layer SL) is formed on the surface of the partition walls 134 forming the cells 136.

The slurry supply pump 226 and the suction pump 236 are stopped when the thickness of the slurry layer SL (the height from the surface of the partition walls 134 to the surface of the slurry layer SL) reaches a predetermined thickness. In this way, a slurry-deposited support 250 having the slurry layer SL on the surface of the partition walls 134 forming the cells 136 is manufactured.

Particle Deposition Step S120

The particle deposition step S120 is a step of depositing particles of a water-absorbing polymer (superabsorbent polymer) (hereinafter also referred to as "water-absorbing particles") on the surface of the slurry layer SL of the slurry-deposited support 250. The water-absorbing polymer is also called superabsorbent polymer, superabsorbent resin, or polymer absorbent. The water-absorbing polymer is, for example, sodium polyacrylate.

Referring back to FIGS. 3A to 3C, the description is continued. As illustrated in FIG. 3C, the particle deposition step S120 in this embodiment includes filling the cells 136 of the slurry-deposited support 250 with the water-absorbing particles using the supply device 210.

The particle supply unit 240 supplies the water-absorbing particles via the guide cylinder 212 to the slurry-deposited support 250 (support 132). In this embodiment, the particle supply unit 240 includes a water-absorbing particle reservoir 242, a water-absorbing particle supply pipe 244, a feeder 246, and a water-absorbing particle nozzle 248.

The water-absorbing particle reservoir 242 stores the water-absorbing particles. The water-absorbing particle supply pipe 244 couples the water-absorbing particle reservoir 242 to the inlet of the feeder 246. The inlet of the feeder 246 is coupled via the water-absorbing particle supply pipe 244 to the water-absorbing particle reservoir 242. The outlet of the feeder 246 is coupled to the water-absorbing particle nozzle 248. The feeder 246 is, for example, a screw feeder. The water-absorbing particle nozzle 248 is coupled to the guide cylinder 212. The feeder 246 supplies the water-absorbing particles from the water-absorbing particle reservoir 242 through the water-absorbing particle nozzle 248 to the slurry-deposited support 250.

In the particle deposition step S120, the slurry nozzle 228 is first detached from the guide cylinder 212. The water-absorbing particle nozzle 248 is then coupled to the guide cylinder 212 instead of the slurry nozzle 228.

The feeder 246 is driven, and the slurry-deposited support 250 is rotated by the rotating device (not illustrated) (indicated by the dashed arrow in FIG. 3C). Thus, the cells 136 of the slurry-deposited support 250 are uniformly filled with the water-absorbing particles. In this embodiment, the suction pump 236 is stopped in the particle deposition step S120.

By performing the particle deposition step S120, the cells 136 are filled with water-absorbing particles R. As illustrated in FIG. 4B, the water-absorbing particles R are deposited on the surface of the slurry layer SL. In this way, a particle-deposited support 252 having the water-absorbing particles R deposited on the surface of the slurry layer SL of the slurry-deposited support 250 is manufactured. In this embodiment, the cells 136 are filled with the water-absorbing particles R in the particle deposition step S120 such that the water-absorbing particles R are in contact with each other.

Expansion Step S130

The expansion step S130 is a step of expanding the water-absorbing particles R to a predetermined size with the water present in the slurry layer SL (catalyst slurry). The expansion step S130 includes allowing the particle-deposited support 252 to stand for a predetermined period of time.

By performing the expansion step S130, the water present in the slurry layer SL is absorbed into the water-absorbing particles R to cause the water-absorbing particles R to expand (swell). As a result, as illustrated in FIG. 4C, the expanded water-absorbing particles R press the slurry layer SL and bite into the slurry layer SL. Thus, areas recessed or projecting with respect to the initial condition (the slurry layer SL of the slurry-deposited support 250, indicated by the dashed line in FIG. 4C) are formed in the surface of the slurry layer SL. In this way, a particle-expanded support 254 having the water-absorbing particles R biting into the surface of the slurry layer SL is manufactured.

Drying Step S140

The drying step S140 is a step of drying the slurry layer SL (particle-expanded support 254) for a predetermined period of time.

Firing Step S150

The firing step S150 is a step of firing the particle-expanded support 254 after the drying step S140. By performing the firing step S150, the water-absorbing particles R are burned and eliminated. As a result, as illustrated in FIG. 4D, a catalyst 130 having a catalyst layer TL in the cells 136 (on the surface of the partition walls 134) is manufactured. The catalyst layer TL has projections P and depressions Q in the surface thereof.

Thus, in the method for manufacturing the catalyst 130 according to this embodiment, the catalyst 130 can be manufactured by performing the catalyst slurry deposition step S110, the particle deposition step S120, the expansion step S130, the drying step S140, and the firing step S150.

Setting of Size of Water-Absorbing Particles R

The setting of the size (initial size m) and filling factor n (bulk density) of the water-absorbing particles R with which the cells 136 are filled in the particle deposition step S120 will be described next.

The size of the projections P and depressions Q of the catalyst layer TL is first determined based on the amount of exhaust gas from the engine 110, the flow rate of exhaust gas, the size of the catalyst 130, the target degree of purification of exhaust gas, and the target pressure loss of the catalyst 130. For example, the projections P and the depressions Q may be made larger to increase the target degree of purification. On the other hand, the projections P and the depressions Q may be made smaller to decrease the target pressure loss. The size M of the water-absorbing particles R and the filling factor N of the water-absorbing particles R after expansion (after the expansion step S130) are derived based on the determined size of the projections P and the depressions Q.

The size M of the water-absorbing particles R after expansion is derived based on the amount of water (water content) in the catalyst slurry (slurry layer SL), the initial size m (before absorption) of the water-absorbing particles R, and the initial amount of water that the water-absorbing particles R are capable of absorbing before absorption. Thus, the initial size m of the water-absorbing particles R with which the cells 136 are filled in the particle deposition step S120 is set based on the initial amount of water which the water-absorbing particles R can absorb before absorption, the amount of water in the catalyst slurry, and the derived size M of the water-absorbing particles R after expansion.

The filling factor n of the water-absorbing particles R in the particle deposition step S120 is set based on the derived filling factor N of the water-absorbing particles R after expansion.

As described above, the method for manufacturing the catalyst 130 according to this embodiment includes the particle deposition step S120 and the expansion step S130. Thus, the water present in the slurry layer SL can be absorbed into the water-absorbing particles R in the cells 136 to expand the water-absorbing particles R. As a result, the water-absorbing particles R press each other in the cells 136, so that the water-absorbing particles R deposited on the surface of the slurry layer SL can bite into the slurry layer SL. Thus, in the method for manufacturing the catalyst 130 according to this embodiment, the projections P and the depressions Q (asperities) can be formed in the surface of the slurry layer SL by the expanded water-absorbing particles R.

By performing the firing step S150 in the method for manufacturing the catalyst 130 according to this embodiment, it is possible to fire the slurry layer SL while maintaining its surface profile. In addition, since the water-absorbing particles R are formed of a water-absorbing polymer, the water-absorbing particles R can be eliminated by performing the firing step S150. Thus, the method for manufacturing the catalyst 130 according to this embodiment allows the manufacture of a catalyst 130 having in the cells 136 the catalyst layer TL having the projections P and the depressions Q in the surface thereof.

When the catalyst 130 manufactured in this way is disposed in the exhaust pipe 120, exhaust gas passes through the cells 136. That is, exhaust gas passes through the cells 136 having the catalyst layer TL including the projections P and the depressions Q in the surface thereof. Thus, unlike cells having a catalyst layer with a flat surface, the catalyst 130 can create turbulence in exhaust gas in the cells 136. Therefore, the catalyst 130 can facilitate diffusion of exhaust gas in the cells 136. Thus, unlike cells having a catalyst layer with a flat surface, the catalyst 130 can reduce the amount of exhaust gas directed into the cells 136 but passing therethrough without contacting (colliding with) the catalyst layer TL. Therefore, the catalyst 130 allows for improved purification efficiency of exhaust gas.

In addition, as described above, the supply device 210 fills the cells 136 with the water-absorbing particles R in the particle deposition step S120. Thus, the water-absorbing particles R deposited on the surface of the slurry layer SL can bite into the slurry layer SL. Therefore, the projections P and depressions Q of the catalyst layer TL can be made larger.

Second Embodiment

In the first embodiment, a case where the cells 136 supplied with the catalyst slurry are filled with the water-absorbing particles R in the particle deposition step S120 has been described by way of example. However, the cells 136 need not be filled with the water-absorbing particles R as long as the water-absorbing particles R can be deposited on the surface of the catalyst slurry.

Figure 5:
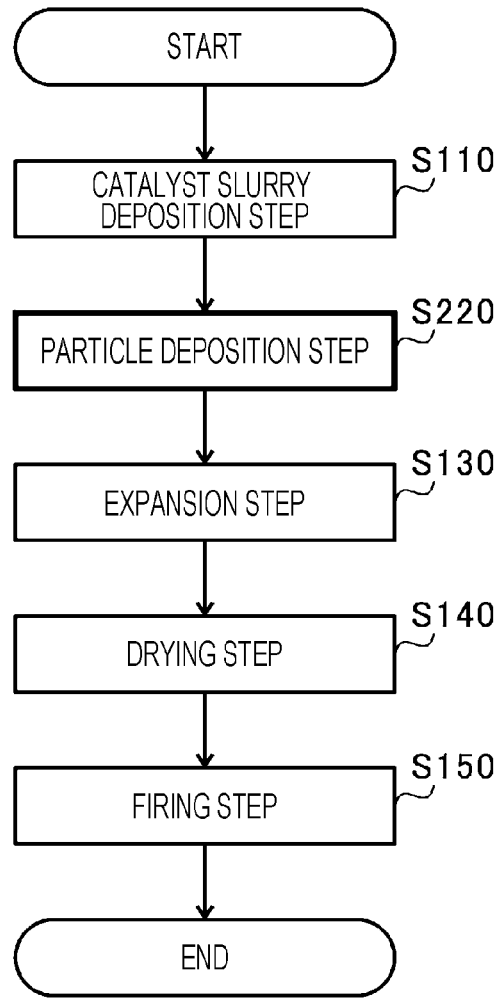
FIG. 5 is a flowchart illustrating the process flow of a method for manufacturing a catalyst according to a second embodiment.

FIG. 5 is a flowchart illustrating the process flow of a method for manufacturing a catalyst 130 according to a second embodiment. As illustrated in FIG. 5, the method for manufacturing the catalyst 130 according to the second embodiment includes the catalyst slurry deposition step S110, a particle deposition step S220, the expansion step S130, the drying step S140, and the firing step S150. The particle deposition step S220, in which the process differs substantially from that in the method for manufacturing the catalyst 130 according to the first embodiment, will hereinafter be described.

The particle deposition step S220 includes supplying the water-absorbing particles R to the cells 136 of the slurry-deposited support 250 using the supply device 210 such that the water-absorbing particles R are not in contact with each other.

FIGS. 6A to 6D illustrate the interior of the cells 136 in the catalyst slurry deposition step S110, the particle deposition step S220, the expansion step S130, and the firing step S150 according to the second embodiment. FIG. 6A illustrates the interior of the cells 136 after the catalyst slurry deposition step S110. FIG. 6B illustrates the interior of the cells 136 after the particle deposition step S220. FIG. 6C illustrates the interior of the cells 136 after the expansion step S130. FIG. 6D illustrates the interior of the cells 136 after the firing step S150.

As illustrated in FIG. 6A, by performing the catalyst slurry deposition step S110 in the second embodiment, a slurry-deposited support 250 having a slurry layer SL on the surface of the partition walls 134 forming the cells 136 is manufactured as in the first embodiment.

In the particle deposition step S220, the slurry nozzle 228 is first detached from the guide cylinder 212. The water-absorbing particle nozzle 248 is then coupled to the guide cylinder 212 instead of the slurry nozzle 228 (see FIGS. 3B and 3C).

The feeder 246 and the suction pump 236 are driven, and the slurry-deposited support 250 is rotated by the rotating device (not illustrated). Thus, the water-absorbing particles R are uniformly supplied to the cells 136 of the slurry-deposited support 250. In the second embodiment, the size of the water-absorbing particles R supplied to the cells 136 is smaller than the distance between the slurry layer SL and itself.

By performing the particle deposition step S220, the water-absorbing particles R are supplied to the cells 136. As illustrated in FIG. 6B, the water-absorbing particles R are deposited on the surface of the slurry layer SL so as to be separated from each other. That is, there are areas where the water-absorbing particles R are deposited and areas where no water-absorbing particles R are deposited in the surface of the slurry layer SL. In this way, a particle-deposited support 262 having the water-absorbing particles R deposited on the surface of the slurry layer SL of the slurry-deposited support 250 is manufactured.

When the expansion step S130 is performed, the water present in the slurry layer SL (catalyst slurry) is absorbed into the water-absorbing particles R. As a result, as illustrated in FIG. 6C, water is absorbed into the water-absorbing particles R in the areas where the water-absorbing particles R are deposited in the surface of the slurry layer SL, and areas recessed with respect to the initial condition (the slurry layer SL of the slurry-deposited support 250) are formed in the surface of the slurry layer SL. In this way, a particle-expanded support 264 having the water-absorbing particles R partially embedded into the surface of the slurry layer SL is manufactured.

When the drying step S140 and the firing step S150 are performed, the water-absorbing particles R are burned and eliminated. As a result, as illustrated in FIG. 6D, a catalyst 130 having a catalyst layer TL in the cells 136 (on the surface of the partition walls 134) is manufactured. The catalyst layer TL has depressions Q in the surface thereof.

As described above, the method for manufacturing the catalyst 130 according to the second embodiment includes the particle deposition step S220 and the expansion step S130. Thus, the depressions Q can be formed in the surface of the slurry layer SL by the water-absorbing particles R. By performing the firing step S150 in the method for manufacturing the catalyst 130 according to the second embodiment, it is possible to fire the slurry layer SL while maintaining the depressions Q. In addition, since the water-absorbing particles R are formed of a water-absorbing polymer, the water-absorbing particles R can be eliminated by performing the firing step S150. Thus, the method for manufacturing the catalyst 130 according to the second embodiment allows the manufacture of a catalyst 130 having in the cells 136 the catalyst layer TL having the depressions Q in the surface thereof. Therefore, the catalyst 130 manufactured by the method for manufacturing the catalyst 130 according to the second embodiment allows for improved purification efficiency of exhaust gas.

In addition, the method for manufacturing the catalyst 130 according to the second embodiment allows the manufacture of a catalyst 130 including a catalyst layer TL having a gentle surface profile as compared to the first embodiment. Thus, the catalyst 130 according to the second embodiment allows for reduced pressure loss as compared to the first embodiment.

Although some embodiments of the disclosure have been described above with reference to the attached drawings, the disclosure is, of course, not limited to these embodiments. It will be obvious to those skilled in the art that it is possible to conceive various changes and modifications within the scope defined by the claims, and it will be understood that such changes and modifications belong to the technical scope of the disclosure.

In the foregoing embodiments, a case where the catalyst 130 is a three-way catalyst has been described by way of example. However, the catalyst 130 may be another catalyst such as a $NO_x$ storage-reduction catalyst.

In the foregoing embodiments, a case where the support 132 is a honeycomb structure has been described by way of example. However, the support 132 may have any shape.

In the foregoing embodiments, a case where the catalyst slurry is deposited in all of the cells 136 of the support 132 in the catalyst slurry deposition step S110 has been described by way of example. However, the catalyst slurry may be deposited in at least one of the cells 136 of the support 132 in the catalyst slurry deposition step S110.

In the first embodiment, a case where the cells 136 are filled with the water-absorbing particles R in the particle deposition step S120 such that the water-absorbing particles R are in contact with each other has been described by way of example. However, the cells 136 may be filled with the water-absorbing particles R in the particle deposition step S120 such that the water-absorbing particles R are not in contact with each other.

Figure 7A:
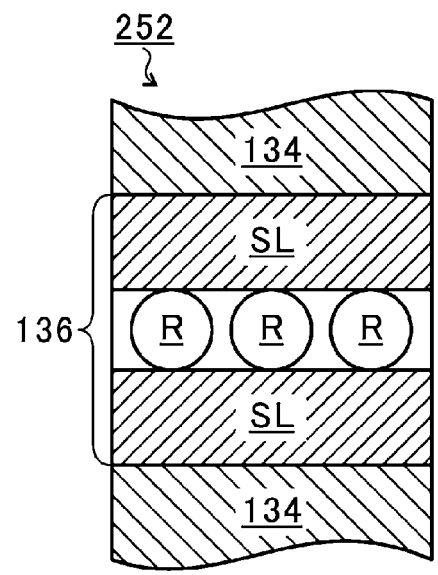
FIGS. 7A and 7B illustrate the interior of cells after a particle deposition step according to a modification.
Figure 7B:
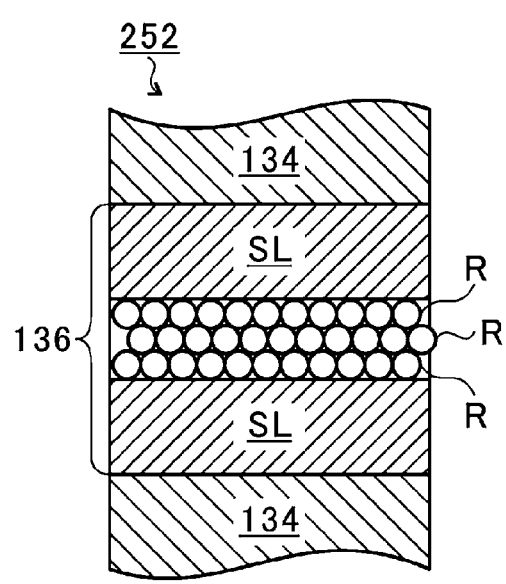

FIGS. 7A and 7B illustrate the interior of the cells 136 after a particle deposition step S120 according to a modification. For example, as illustrated in FIG. 7A, the cells 136 may be filled with the water-absorbing particles R in one layer in the particle deposition step S120. In this step, the water-absorbing particles R may or may not be in contact with each other. In this case, the size of the water-absorbing particles R may be substantially the same as the distance between the slurry layer SL and itself.

In the first embodiment, a case where all of the water-absorbing particles R are in contact with the surface of the slurry layer SL in the particle deposition step S120 has been described by way of example. However, as illustrated in FIG. 7B, of the water-absorbing particles R with which the cells 136 are filled, there may be water-absorbing particles R that are not in contact with the surface of the slurry layer SL.

In the first embodiment, a case where the cells 136 of the slurry-deposited support 250 are filled with the water-absorbing particles R over the entire length in the particle deposition step S120 has been described by way of example. However, the cells 136 of the slurry-deposited support 250 may first be partially filled with the water-absorbing particles R by performing the particle deposition step S120 in the first embodiment, and the remaining portion may then be supplied with the water-absorbing particles R by performing the particle deposition step S220 in the second embodiment.

In the foregoing embodiments, a case where the particle supply unit 240 of the supply device 210 includes the feeder 246 has been described by way of example. However, the particle supply unit 240 need not include the feeder 246. In this case, the slurry-deposited support 250 may be disposed such that one end is located above the other end, and the water-absorbing particle reservoir 242 may be disposed above the water-absorbing particle nozzle 248 so that the water-absorbing particles R fall on its own weight from the water-absorbing particle reservoir 242 onto the slurry-deposited support 250.

The invention claimed is:

1. A method for manufacturing a catalyst, the method comprising:
   depositing a catalyst slurry comprising at least a catalyst metal and water on a support;
   depositing particles of a water-absorbing polymer on a surface of the catalyst slurry;
   expanding the particles with the water present in the catalyst slurry to press the catalyst slurry with the expanded particles such that recesses or projections are formed by the expanded particles on the surface of the catalyst slurry; and
   removing the expanded particles from the support having the catalyst slurry, thereby leaving the recesses or projections on the surface of the catalyst slurry.

2. The method for manufacturing a catalyst according to claim 1, wherein:
   the support has a plurality of cells defined by partition walls,
   the depositing the catalyst slurry on the support comprises supplying the catalyst slurry to at least one of the cells of the support,
   the depositing the particles on the surface of the catalyst slurry comprises filling, with the particles, the cell supplied with the catalyst slurry, and
   the expanding the particles comprises expanding the particles with the water present in the catalyst slurry to press the catalyst slurry with the expanded particles.

3. The method for manufacturing a catalyst according to claim 1, wherein
   the support has a plurality of cells defined by partition walls,
   the depositing the catalyst slurry on the support comprises supplying the catalyst slurry to at least one of the cells of the support,
   the depositing the particles on the surface of the catalyst slurry comprises supplying the particles to the cell supplied with the catalyst slurry such that the particles are not in contact with each other, and
   the expanding the particles comprises allowing the particles to absorb the water present in the catalyst slurry.

4. A catalyst manufactured by the method according to claim 1.

5. A catalyst manufactured by the method according to claim 2.

6. A catalyst manufactured by the method according to claim 3.

7. The method for manufacturing a catalyst according to claim 1, wherein the water-absorbing polymer comprises sodium polyacrylate.

8. The method for manufacturing a catalyst according to claim 1, wherein the particles are removed by firing the support having the catalyst slurry and the particles deposited thereon.

9. A method for manufacturing a catalyst layer, the method comprising:
   depositing a first catalyst slurry layer on a first surface of a support and a second catalyst sully layer on a second surface of the support facing the first surface, the first and second catalyst slurry layers comprising at least a catalyst metal and water;
   depositing particles of a water-absorbing polymer on a first surfaces of the first catalyst slurry layer and a second surface of the second catalyst slurry layer between the first surface of the first catalyst slurry layer and the second surface of the second catalyst slurry layer;
   expanding the particles with the water present in the catalyst slurry to press the first and second catalyst slurry layers with the expanded particles such that recesses or projections are formed by the expanded particles on the first surface of the first catalyst slurry layer and the second surface of the second catalyst slurry layer; and
   removing the expanded particles from the first and second slurry layers, leaving the recesses or projections on the first surface of the first slurry layer and the second surface of the second slurry layer.

* * * * *